(12) United States Patent
Geiger

(10) Patent No.: US 10,161,533 B2
(45) Date of Patent: Dec. 25, 2018

(54) BI-STABLE ELECTRICALLY ACTUATED VALVE

(71) Applicant: PicoBrew, LLC, a Delaware Corporation, Seattle, WA (US)

(72) Inventor: Avi R. Geiger, Seattle, WA (US)

(73) Assignee: PicoBrew, Inc., Seattle, WA (US)

( * ) Notice: Subject to any disclaimer, the term of this patent is extended or adjusted under 35 U.S.C. 154(b) by 51 days.

(21) Appl. No.: 15/149,714

(22) Filed: May 9, 2016

(65) Prior Publication Data

US 2017/0321810 A1 Nov. 9, 2017

(51) Int. Cl.
| | |
|---|---|
| *F16K 7/06* | (2006.01) |
| *F16K 11/02* | (2006.01) |
| *F16K 31/04* | (2006.01) |
| *F16K 31/06* | (2006.01) |

(52) U.S. Cl.
CPC ............ *F16K 7/065* (2013.01); *F16K 11/027* (2013.01); *F16K 31/047* (2013.01); *F16K 31/0672* (2013.01); *Y10T 137/87161* (2015.04)

(58) Field of Classification Search
CPC ..... Y10T 137/87161; Y10T 137/87153; Y10T 137/86509; Y10T 137/86911; Y10T 137/86919; Y10T 137/86928; Y10T 137/87024; Y10T 137/8708; F16K 7/065; F16K 31/047; F16K 31/0665; F16K 11/027; F16K 7/045; F16K 7/06; A61M 39/285
USPC .................................... 251/4, 6–10; 604/250
See application file for complete search history.

(56) References Cited

U.S. PATENT DOCUMENTS

| | | | | |
|---|---|---|---|---|
| 113,016 | A | * 3/1871 | Bunce ................. | A61M 39/284 |
| | | | | 251/9 |
| 941,009 | A | 11/1909 | Cauchois | |
| 1,297,456 | A | * 3/1919 | Frey .................... | A61M 39/284 |
| | | | | 24/499 |
| 1,686,003 | A | * 10/1928 | Hottinger ............. | B05B 7/0884 |
| | | | | 137/594 |
| 2,471,623 | A | * 5/1949 | Hubbell .............. | A61M 5/1424 |
| | | | | 137/625.18 |

(Continued)

FOREIGN PATENT DOCUMENTS

| | | |
|---|---|---|
| DE | 202012103852 U1 | 11/2012 |
| GB | 1444344 A | 7/1976 |

(Continued)

OTHER PUBLICATIONS

Aurora Haley, "Icon Usability" published Jul. 27, 2014, Nielsen Norman Group, 8 pages.

(Continued)

*Primary Examiner* — Reinaldo Sanchez-Medina
*Assistant Examiner* — David Colon Morales
(74) *Attorney, Agent, or Firm* — Russell S. Krajec; Krajec Patent Offices, LLC

(57) ABSTRACT

A pinch valve may use a spring force to close a collapsible tube at a pinch point, and may open with a cam mechanism, which may be controlled using an electric motor. The open and closed positions of the pinch valve may be stable without the use of continuing electrical energy, and electrical energy may be consumed during a change between positions. One arrangement may use multiple tubes in a circular arrangement with a cam that may operate one or more of the valves at a time. The cam mechanism may be driven by an electric motor.

9 Claims, 4 Drawing Sheets

(56) References Cited

U.S. PATENT DOCUMENTS

| | | | | |
|---|---|---|---|---|
| 2,531,802 A * | 11/1950 | Boyer | ............... | B01D 35/00 137/594 |
| 2,547,481 A | 4/1951 | J | | |
| 2,761,200 A | 9/1956 | Arnett | | |
| 2,830,528 A | 4/1958 | Arnett | | |
| 2,969,064 A * | 1/1961 | Metz | ............... | A61G 7/05 251/9 |
| 2,985,192 A * | 5/1961 | Sinclair | ............... | F04B 7/00 137/627.5 |
| 3,057,726 A | 10/1962 | Teignmouth | | |
| 3,102,813 A | 9/1963 | Teignmouth et al. | | |
| 3,232,211 A | 2/1966 | O'malley | | |
| 3,408,034 A * | 10/1968 | Lau | ............... | B65B 1/42 24/463 |
| 3,411,534 A * | 11/1968 | Rose | ............... | A61M 39/28 137/595 |
| 3,506,032 A * | 4/1970 | Eveleigh | ............... | F04B 43/1253 137/624.2 |
| 3,511,469 A * | 5/1970 | Bell | ............... | F16K 7/045 251/129.1 |
| 3,550,619 A * | 12/1970 | Halasz | ............... | A61M 39/28 137/595 |
| 3,563,157 A | 2/1971 | Lenz | | |
| 3,575,161 A * | 4/1971 | London | ............... | A61B 5/0235 137/595 |
| 3,598,288 A * | 8/1971 | Posgate | ............... | F16K 7/068 137/892 |
| 3,683,790 A | 8/1972 | Jr et al. | | |
| 3,759,483 A * | 9/1973 | Baxter | ............... | F16K 7/06 251/251 |
| 3,779,507 A * | 12/1973 | Clarke | ............... | A61M 39/284 251/4 |
| 3,882,899 A * | 5/1975 | Ginsberg | ............... | F04B 7/02 137/627.5 |
| 3,918,490 A * | 11/1975 | Goda | ............... | F16K 7/065 137/240 |
| 3,984,326 A | 10/1976 | Bendel | | |
| 4,051,867 A * | 10/1977 | Forberg | ............... | A61M 39/286 137/595 |
| 4,054,523 A | 10/1977 | Ingenito et al. | | |
| 4,077,601 A * | 3/1978 | Dick | ............... | F16K 7/066 24/134 R |
| 4,114,640 A * | 9/1978 | Forman | ............... | A61F 5/4407 137/381 |
| 4,176,671 A * | 12/1979 | Citrin | ............... | F16K 7/02 137/1 |
| 4,259,985 A * | 4/1981 | Bergmann | ............... | F16K 7/045 137/595 |
| 4,261,388 A * | 4/1981 | Shelton | ............... | A61M 5/1689 137/486 |
| 4,282,902 A * | 8/1981 | Haynes | ............... | F16K 7/065 137/595 |
| 4,328,946 A * | 5/1982 | Morin | ............... | F16K 7/065 251/9 |
| 4,373,024 A | 2/1983 | Hunt | | |
| 4,441,406 A | 4/1984 | Becker et al. | | |
| 4,457,339 A * | 7/1984 | Juan | ............... | F16K 7/065 137/624.16 |
| 4,484,599 A * | 11/1984 | Hanover | ............... | F16K 7/065 137/595 |
| 4,503,502 A | 3/1985 | Chapin | | |
| 4,508,148 A * | 4/1985 | Trechsel | ............... | B65B 3/36 141/140 |
| 4,524,802 A * | 6/1985 | Lawrence | ............... | F16K 11/027 137/595 |
| 4,552,060 A | 11/1985 | Redl et al. | | |
| 4,557,186 A | 12/1985 | Brown | | |
| 4,691,738 A * | 9/1987 | McCune | ............... | A61B 17/1355 137/595 |
| 4,694,861 A * | 9/1987 | Goodale | ............... | F16K 7/045 137/595 |
| 4,751,875 A | 6/1988 | Wooten | | |
| 4,754,696 A | 7/1988 | Sarazen et al. | | |
| 4,754,698 A | 7/1988 | Naish | | |
| 4,786,028 A * | 11/1988 | Hammond | ............... | F16K 7/065 126/380.1 |
| 4,790,239 A | 12/1988 | Hewitt | | |
| 4,833,329 A * | 5/1989 | Quint | ............... | G21G 4/08 137/573 |
| 4,846,969 A | 7/1989 | Ordelheide et al. | | |
| 4,852,551 A * | 8/1989 | Opie | ............... | A61B 1/00068 137/595 |
| 4,993,594 A * | 2/1991 | Becker | ............... | B01F 13/002 137/607 |
| 5,113,906 A * | 5/1992 | Hogner | ............... | F16K 7/065 137/595 |
| 5,117,870 A * | 6/1992 | Goodale | ............... | F16K 7/065 137/595 |
| 5,158,793 A | 10/1992 | Helbling | | |
| 5,265,518 A | 11/1993 | Reese et al. | | |
| 5,311,811 A | 5/1994 | Kuzyk | | |
| 5,320,256 A * | 6/1994 | Wood | ............... | B65D 47/2037 222/212 |
| 5,326,033 A * | 7/1994 | Anfindsen | ............... | F16K 7/065 239/300 |
| 5,409,194 A * | 4/1995 | Blanc | ............... | F16K 7/045 251/129.11 |
| 5,413,566 A | 5/1995 | Sevrain et al. | | |
| 5,769,385 A * | 6/1998 | Burrous | ............... | A61M 1/367 251/251 |
| 5,865,093 A | 2/1999 | Wasmuht et al. | | |
| 5,868,062 A | 2/1999 | Enomoto | | |
| 5,901,745 A * | 5/1999 | Buchtel | ............... | F16K 7/06 137/595 |
| 5,906,151 A | 5/1999 | Firestone et al. | | |
| 5,922,191 A | 7/1999 | Mata et al. | | |
| 5,970,846 A | 10/1999 | Roehr | | |
| 6,032,571 A | 3/2000 | Brous et al. | | |
| 6,276,264 B1 | 8/2001 | Dumm | | |
| 6,475,537 B1 | 11/2002 | King et al. | | |
| 6,629,490 B1 | 10/2003 | Lu et al. | | |
| 6,648,017 B2 * | 11/2003 | Lamas | ............... | A61C 1/0061 137/595 |
| 6,666,967 B1 | 12/2003 | Oyabu | | |
| 6,708,944 B2 * | 3/2004 | Pfeil | ............... | A61M 5/16881 251/6 |
| 6,871,660 B2 * | 3/2005 | Hampsch | ............... | F16K 31/465 137/1 |
| 7,367,358 B2 * | 5/2008 | Malcolm | ............... | A61M 5/16827 137/595 |
| 7,836,914 B2 * | 11/2010 | Drott | ............... | A61M 39/223 137/625.47 |
| 7,963,213 B1 | 6/2011 | Murdock | | |
| 8,141,477 B2 | 3/2012 | Broderick | | |
| 8,286,933 B2 * | 10/2012 | Hanada | ............... | F16K 7/065 251/229 |
| 8,839,711 B2 * | 9/2014 | Reyhanloo | ............... | A47J 31/4485 137/595 |
| 8,993,273 B1 | 3/2015 | Blichmann | | |
| 9,067,051 B2 * | 6/2015 | Loth | ............... | A61M 37/0076 |
| 9,102,908 B1 | 8/2015 | Mitchell et al. | | |
| 9,109,192 B1 | 8/2015 | Mitchell et al. | | |
| 9,228,163 B1 | 1/2016 | Mitchell et al. | | |
| 9,279,507 B2 * | 3/2016 | Tadano | ............... | F16K 7/06 |
| 9,376,653 B1 | 6/2016 | Mitchell et al. | | |
| 9,688,949 B2 | 6/2017 | Mitchell et al. | | |
| 9,932,547 B2 | 4/2018 | Mitchell et al. | | |
| 2001/0035097 A1 | 11/2001 | Shaanan et al. | | |
| 2002/0029694 A1 | 3/2002 | Wong | | |
| 2003/0019031 A1 | 1/2003 | Mosis | | |
| 2003/0153059 A1 | 8/2003 | Pilkington et al. | | |
| 2005/0011364 A1 | 1/2005 | Chen et al. | | |
| 2005/0103213 A1 | 5/2005 | Dumm | | |
| 2005/0160917 A1 | 7/2005 | Gantt et al. | | |
| 2007/0157928 A1 * | 7/2007 | Pujol | ............... | A61M 16/16 128/204.14 |
| 2008/0000357 A1 | 1/2008 | Yang et al. | | |
| 2008/0282897 A1 | 11/2008 | Webster et al. | | |
| 2009/0007796 A1 | 1/2009 | Ricotti | | |

(56) References Cited

U.S. PATENT DOCUMENTS

| | | |
|---|---|---|
| 2009/0229471 A1 | 9/2009 | Lun et al. |
| 2009/0246341 A1 | 10/2009 | Pitner et al. |
| 2010/0064900 A1 | 3/2010 | Reyhanloo |
| 2010/0107887 A1 | 5/2010 | Bentley et al. |
| 2010/0236949 A1 | 9/2010 | Vacca et al. |
| 2010/0313765 A1 | 12/2010 | Hale |
| 2011/0095212 A1* | 4/2011 | Brieske ............... A61M 39/284 251/9 |
| 2011/0147411 A1* | 6/2011 | Bernal .................. F16K 7/065 137/624.18 |
| 2011/0246091 A1 | 10/2011 | Fedele |
| 2011/0268846 A1 | 11/2011 | Nair et al. |
| 2012/0310413 A1 | 12/2012 | Bluck et al. |
| 2013/0202487 A1 | 8/2013 | Gorelik et al. |
| 2014/0017354 A1 | 1/2014 | Joseph et al. |
| 2014/0092706 A1 | 4/2014 | Ishii |
| 2014/0234482 A1 | 8/2014 | Kempfert |
| 2014/0287129 A1 | 9/2014 | Hutcheson et al. |
| 2015/0000530 A1 | 1/2015 | Mitchell et al. |
| 2015/0000531 A1 | 1/2015 | Mitchell et al. |
| 2015/0000532 A1 | 1/2015 | Mitchell et al. |
| 2015/0161871 A1 | 6/2015 | Kim |
| 2015/0232798 A1* | 8/2015 | Zhou ..................... C12M 29/00 435/289.1 |
| 2015/0257573 A1 | 9/2015 | Gabara |
| 2016/0075979 A1 | 3/2016 | Mitchell |
| 2016/0272927 A1 | 9/2016 | Mitchell |
| 2016/0272928 A1 | 9/2016 | Mitchell |
| 2017/0022462 A1 | 1/2017 | Mitchell et al. |
| 2017/0029752 A1 | 2/2017 | Mitchell et al. |
| 2017/0051236 A1 | 2/2017 | Mitchell |
| 2017/0130177 A1 | 5/2017 | Geiger |
| 2017/0130178 A1 | 5/2017 | Mitchell |
| 2017/0321810 A1 | 11/2017 | Geiger |
| 2018/0057778 A1 | 3/2018 | Mitchell |
| 2018/0171273 A1 | 6/2018 | Mitchell et al. |

FOREIGN PATENT DOCUMENTS

| | | | |
|---|---|---|---|
| GB | 2274326 A * | 7/1994 | ............ F16K 7/045 |
| WO | 2015173037 A1 | 11/2015 | |
| WO | 2016057981 A1 | 4/2016 | |

OTHER PUBLICATIONS

BeerSmith 2 (www.youtube.com/watch?v=68t9_IK-4vY) published Jun. 5, 2011 and accessed Mar. 5, 2018.

BeerTools Pro 1.5 Brewing Software in (www.youtube.com/watch?v=REgYNF_3SZc) published online Mar. 21, 2011 and accessed Mar. 5, 2015.

International Search Report, Intellectual Property Office of Singapore, PCT/IB2017/052677, dated Feb. 8, 2017.

Jeff Flowers, How to Raise the ABV of Your Homebrew, May 1, 2014, https://learn.kegerator.com/raising-abv/ (accessed Mar. 1, 2018), pp. 1-10.

Ken Schwartz, Son of Fermentation Chiller or, "Better Late than Never . . . ", pp. 1-14, 1997.

Vinepair, Tasting Beer—The Role of Alcohol by Volume (ABV) https://vinepair.com/beer-101/tasting-beer-the-role-of-alcohol-by-volume-abv/ (accessed Mar. 1, 2018), pp. 1-5.

Written Opinion of ISA, Intellectual Property Office of Singapore, PCT/IB2017/052677, dated Feb. 8, 2017.

* cited by examiner

BI-STABLE ELECTRICALLY ACTUATED VALVE

BACKGROUND

Pinch valves use a collapsible or pinchable tube that may be closed using a pinching mechanism. When the valve is closed, pressure is exerted on the tube such that the tube squeezes shut at a pinch point. The valve may remain closed as long as the pressure is exerted. When the pressure is relieved, the collapsible tube may open and flow may resume.

SUMMARY

A pinch valve may use a spring force to close a collapsible tube at a pinch point, and may open with a cam mechanism, which may be controlled using an electric motor. The open and closed positions of the pinch valve may be stable without the use of continuing electrical energy, and electrical energy may be consumed during a change between positions. One arrangement may use multiple tubes in a circular arrangement with a cam that may operate one or more of the valves at a time. The cam mechanism may be driven by an electric motor or other controllable force.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Bi-Stable Pinch Valve

Figure 1:
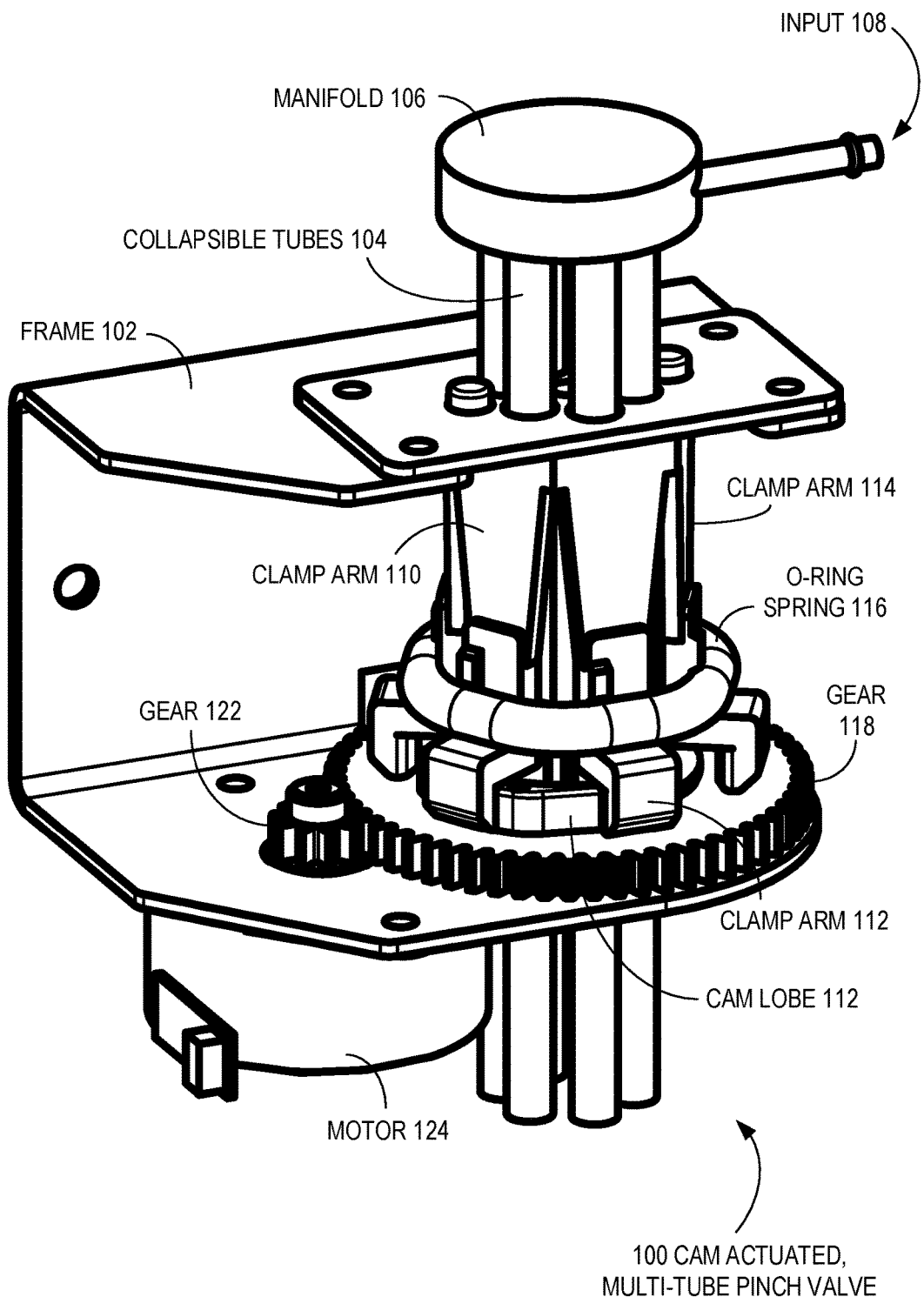
FIG. 1 is a diagram illustration of an embodiment showing a cam actuated, multi-tube pinch valve. The illustration is not to scale.

A pinch valve may have a collapsible tube that may be either pinched or open in a stable position, such that energy may not be consumed in either state. An electric actuation mechanism may cause a change from one state to the other.

One version may have one or more multiple collapsible tubes which may be biased in a collapsed or closed position using individual fingers. Each of the fingers may be opened by a mechanism that may spread the finger. The spreading mechanism may be a wedge, roller, cam, or other mechanism that may cause the finger to open the collapsed tube, and the spreading mechanism may remain in an open position without consuming energy.

A cylindrical version may have a set of tubes arranged along a central axis, with each tube having a clamping finger. The clamping finger may be held with a spring or other mechanism to clamp the respective tube closed. A cam mechanism may rotate around the central axis powered by an electric motor, and the cam mechanism may cause a clamping finger to spread open. The cam mechanism may be configured such that the cam may be left in place without consuming any electric energy, thereby keeping a valve open without consuming energy.

A pinch valve manifold may have two or more collapsible tubes, each of which may be independently or jointly operated. In many cases, a manifold may connect to a source input and to each of the various tubes. Many such versions may be configured to operate one of the collapsible tubes at a time, with the remaining tubes being held in a collapsed state.

The pinch valve may use an electrical force or other force generator to change from one position to another. Some embodiments may use electric solenoids, pneumatic or hydraulic actuators, or other force generator to move a cam mechanism from one position to another. When the cam may be in a position to open or close a pinch valve, the mechanism may be mechanically stable such that no energy may be consumed to maintain either an open or closed state.

A cylindrical version may operate with a single cam lobe that may be sized to open one valve at a time. Such cam lobe may operate each valve in sequence around the cylinder. In some cases, the cam lobe may be sized and the valves spaced such that one valve may begin opening while another valve begins closing. Such a configuration may be useful in situations where continuous flow may be desired as the valves change. In other cases, the cam lobe may be sized and the valves spaced such that one valve closes completely before a second valve begins opening.

Some embodiments may have multiple cam lobes. In such embodiments, the cam lobes may be positioned such that two or more valves may be open at once. For example, several cam lobes may be positioned such that two, three, or more valves may be opened at the same time.

In some cases, cam lobes may be configured with several positions between each valve. Such embodiments may permit several sets of lobes, and in one example, one set may open one group of valves, the second set may open a second set of valves, and a third may open a third set of valves. In such an embodiment, three cam lobes or positions for cam lobes may be located between each pair of valves.

In many embodiments illustrated in the Figures, the valves may be illustrated as being evenly distributed about a central axis. Other embodiments may place certain neighboring valves closer to each other such that a single cam lobe may open both valves, and such embodiments may also place other valves further away from its neighbors such that the cam lobe may operate one valve without operating others.

The cam lobes and valves may be positioned to operate the valves in a predefined sequence. For example, the sequence of valves may be defined by a process that a machine may perform. The valves may be arranged such that the proper ingredients, for example, may be added to a container. By arranging each ingredient tube in the same sequence as called for in a recipe, the valve may be actuated by stepping from one valve to the next as each ingredient was added.

In some cases, the valve may be used to dispense any of the plurality of ingredients. In such a use case, the cam lobe may be positioned at any of the various valves with each use.

Throughout this specification, an example valve mechanism may use a cam and springs or other elements to hold a valve open or closed. Other embodiments may be other bi-stable mechanisms, such as magnets or other mechanisms. Magnets may be employed to hold a valve open and closed in various bi-stable arrangements, and such mechanisms may use mechanical forces, electromagnets, or other mechanism to cause the valves to change state.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

FIG. 1 is a diagram illustration of an embodiment 100 showing a view of a cam actuated, multi-tube pinch valve. The illustration is not to scale.

Embodiment 100 is merely one example of a pinch valve that is bi-stable, meaning that energy is not consumed when in either the open or closed position. Embodiment 100 may use a spring to force the collapsible tubes closed and a cam lobe to overcome the closing force and open the tube.

Embodiment 100 uses a cam lobe 120 that rotates about a circular track formed by a gear 118. The gear 118 may be powered by an electric motor 124 connected to a second gear 122.

A frame 102 may support the valve mechanism, which may have six collapsible tubes 104. The collapsible tubes 104 may be connected to a manifold 106 which may have a single input 108.

A series of clamp arms 110, 112, and 114 are visible, and each collapsible tube 104 may have its own clamp arm. The clamp arms may be pressed against the collapsible tubes 104 by force provided by an o-ring spring 116.

The o-ring spring 116 may be sized such that tension in the o-ring may cause the clamp arms to compress against the collapsible tubes 104.

A gear 118 may have a cam lobe 120 that may be rotated under one of the clamp arms to open a collapsible tube and allow flow through the tube.

The arrangement of embodiment 100 illustrates a valve mechanism where one of the collapsible tubes 104 may be opened at a time. With the addition of other cam lobes, two or more tubes may be opened at a time.

Figure 2:
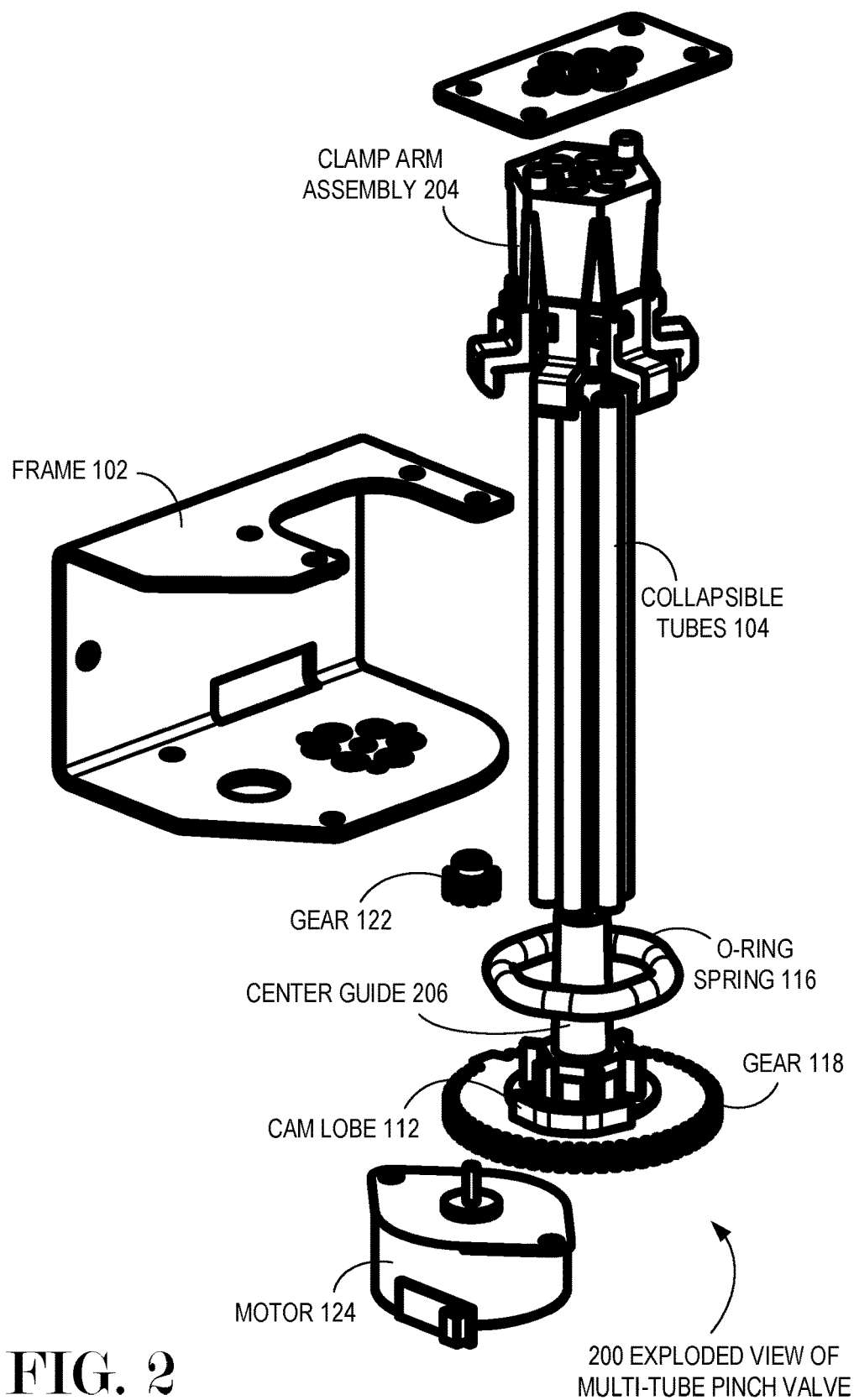
FIG. 2 is a diagram illustration of an embodiment showing a cam actuated, multi-tube pinch valve in an exploded state. The illustration is not to scale.

FIG. 2 is a diagram illustration of an embodiment 200 showing an exploded view of the multi-tube pinch valve of embodiment 100. The illustration is not to scale.

A center guide 206 may mount in the frame 102. The gear 118 may rotate about the center guide 206 and may be powered by the gear 122 and motor 124.

The center guide 206 may have guides through which the collapsible tubes 104 may pass, and may serve as a stationary portion of a pinch point that may close the collapsible tubes 104 when pinched by the various clamp arms of the clamp arm assembly 204.

The clamp arm assembly 204 may illustrate one mechanism for providing movable clamp arms. The clamp arms may be opened using the cam lobe 112 and may be held in a closed position by the o-ring spring 116 that may encircle the various clamp arms.

The design of the clamp arm assembly 204 may be illustrated as a single piece where each clamp arm may flex or rotate to move from a clamped or closed position to an open position. In some cases, the clamp arms may have a mechanical bias or pre-sprung force that may be sufficient to hold the collapsible tubes closed without a second spring, such as the o-ring spring 116. Other designs of clamp arms may have each clamp arm mounted on an individual hinge.

Figure 3:
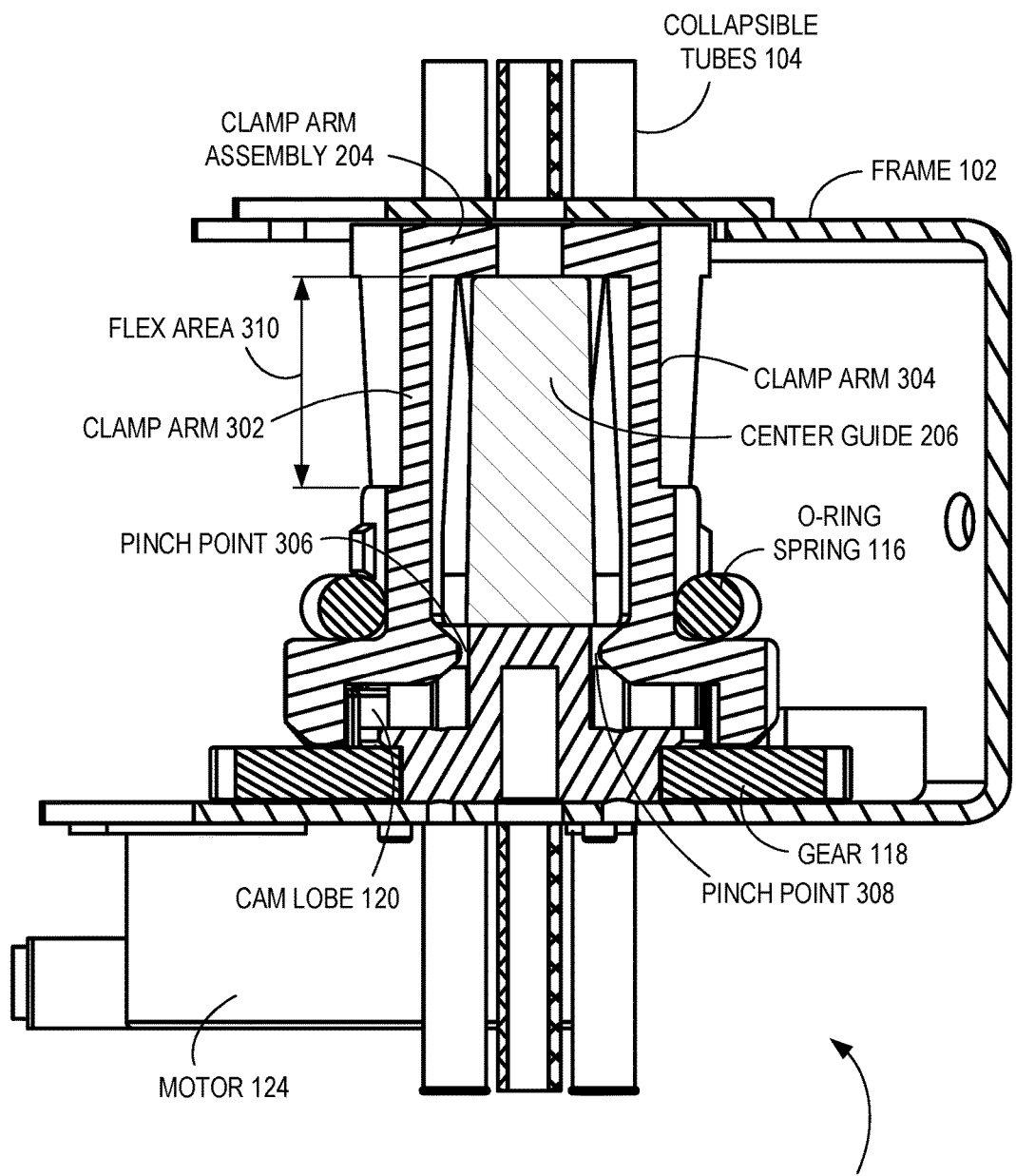
FIG. 3 is a diagram illustration of an embodiment showing a cam actuated, multi-tube pinch valve in cross-section. The illustration is not to scale.

FIG. 3 is a diagram illustration of an embodiment 300 showing an section view of the multi-tube pinch valve of embodiment 100. The section view shows one clamp arm 304 in a closed state and another clamp arm 302 in an open state. The illustration is not to scale.

The frame 102 is illustrated with the clamp arm assembly 204. The gear 118 may rotate about the stationary center guide 206. The gear 118 may be rotated by the motor 124.

Clamp arm 304 is illustrated as closing or pinching its collapsible tube 104 at a pinch point 308. The o-ring spring 116 may apply sufficient force to pinch the collapsible tube 104 and stop any flow through the collapsible tube.

Clamp arm 302 is illustrated as being open. The cam lobe 120 may force the clamp arm 302 and may overcome the spring force that may be applied by the o-ring spring 116. The cam lobe 120 may be rotated into place by the motor 124, and once in place, the motor 124 may not apply any further energy to maintain the clamp arm 302 in an open position.

The clamp arm 302 may flex in the flex area 310 to open at the pinch point 306. In some cases, the clamp arm 302 may be mounted with a hinge that may pivot to allow the clamp arm 302 to open and close.

Figure 4:
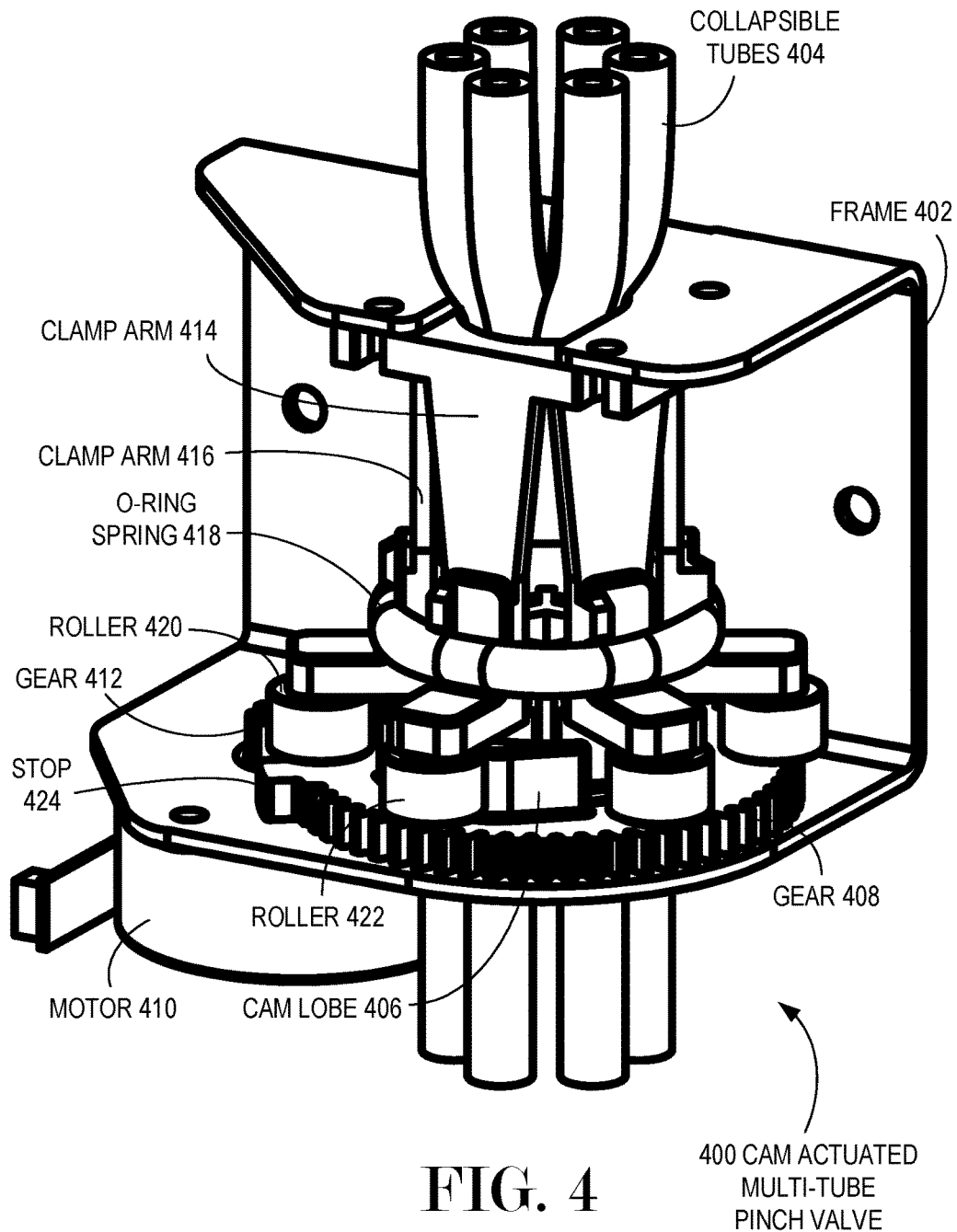
FIG. 4 is a diagram illustration of a second embodiment showing a cam actuated, multi-tube pinch valve with roller cam followers. The illustration is not to scale.

FIG. 4 is a diagram illustration of an embodiment 400 showing a multi-tube pinch valve with rollers mounted on clamp arms. The illustration is not to scale.

Embodiment 400 may be similar to the other embodiments in operation and general construction, but may illustrate a version where roller elements may be attached to the end of clamp arms. The roller elements may reduce friction or drag when the cam lobe may be rotated under the various clamp arms.

A frame 402 may support the mechanism through which various collapsible tubes 404 may pass. In the example of the embodiments illustrated, there may be six collapsible tubes, however, other embodiments may have any number of collapsible tubes, including embodiments with one, two, three, four, five, or more collapsible tubes. The precise number of collapsible tubes may vary from one application to another.

A cam lobe 406 may be attached to a gear 408, which may be driven by a motor 410 attached to a second gear 412.

Multiple clamp arms 414, 416, and others may be illustrated. The clamp arms may be held in a closed or pinched position by an o-ring spring 418.

Each clamp arm may be outfitted with a roller, such as the rollers 420 and 422 attached to clamp arms 414 and 416. The rollers 420 may be ball bearings, rolling sleeves, or other components that may rotate on a vertical axis (as shown) to minimize sliding friction when the cam lobe 406 may pass underneath causing a clamp arm to open.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A valve bank comprising:
   a plurality of collapsible tubes, said collapsible tubes being arranged about a central axis;
   a clamp arm assembly comprising, for each of said collapsible tubes:
      a clamp disposed to pinch said collapsible tube; and
      a closing force generator generating a closing force against said collapsible tube, said closing force generator simultaneously applying said closing force to each clamp in said clamp arm assembly;
   a cam mechanism comprising a moving cam lobe adapted to rotate about said central axis, said moving cam lobe being disposed to open a first one of said clamps and thereby open a first one of said collapsible tubes.

2. The valve bank of claim 1 further comprising:
   an electric motor disposed to drive said moving cam lobe.

3. The valve bank of claim 2, said cam mechanism further comprising a stop.

4. The valve bank of claim 2, said closing force generator comprising a tension mechanism mounted around each of said clamps.

5. The valve bank of claim 4, said tension mechanism being an elastic member.

6. The valve bank of claim 1 further comprising:
   a manifold having an intake and a plurality of outputs, each of said outputs being connected to said plurality of collapsible tubes.

7. The valve bank of claim 1, said clamp arm assembly being manufactured as a single piece with said clamps.

8. The valve bank of claim 1, said cam mechanism comprising a roller.

9. The valve bank of claim 1, said closing force generator being an O-ring.

* * * * *